(12) United States Patent
King

(10) Patent No.: US 10,880,075 B2
(45) Date of Patent: *Dec. 29, 2020

(54) METHOD AND SYSTEM FOR FAST TRACKING NAVIGATION OF BLOCKCHAINS VIA DATA MANIPULATION

(71) Applicant: MASTERCARD INTERNATIONAL INCORPORATED, Purchase, NY (US)

(72) Inventor: David J. King, Guildford (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 4 days.

This patent is subject to a terminal disclaimer.

(21) Appl. No.: 16/443,201

(22) Filed: Jun. 17, 2019

(65) Prior Publication Data
US 2019/0305936 A1 Oct. 3, 2019

Related U.S. Application Data

(63) Continuation of application No. 15/332,348, filed on Oct. 24, 2016, now Pat. No. 10,348,484.

(51) Int. Cl.
| | | |
|---|---|---|
| *H04L 29/06* | (2006.01) | |
| *H04L 9/32* | (2006.01) | |
| *H04L 9/06* | (2006.01) | |
| *H04L 9/08* | (2006.01) | |
| *H04L 9/14* | (2006.01) | |
| *H04L 9/30* | (2006.01) | |
| *G06F 16/951* | (2019.01) | |
| *G06F 21/64* | (2013.01) | |

(52) U.S. Cl.
CPC .......... *H04L 9/0637* (2013.01); *G06F 16/951* (2019.01); *G06F 21/64* (2013.01);
(Continued)

(58) Field of Classification Search
CPC ....... H04L 9/0637; H04L 9/0861; H04L 9/14; H04L 9/30; H04L 9/0643; H04L 9/3247;
(Continued)

(56) References Cited

U.S. PATENT DOCUMENTS

| | | | |
|---|---|---|---|
| 9,635,000 B1* | 4/2017 | Muftic | H04L 9/3239 |
| 2016/0028552 A1* | 1/2016 | Spanos | H04L 9/3236 |
| | | | 713/178 |
| 2017/0180134 A1 | 6/2017 | King | |

OTHER PUBLICATIONS

Dennis et al., Rep on the Roll: A Peer to Peer Reputation System Based on a Rolling Blockchain, 2016. (Year: 2016).*
(Continued)

*Primary Examiner* — Trong H Nguyen
*Assistant Examiner* — Amie C. Lin
(74) *Attorney, Agent, or Firm* — Buchanan Ingersoll & Rooney PC

(57) ABSTRACT

A method for generating a blockchain configured for fast navigation includes: storing a blockchain comprised of a plurality of blocks, each block including a header comprised of a fast track flag, fast track reference, timestamp, and hash value, where the plurality of blocks includes standard blocks having a deactivated fast track flag and fast track blocks having an activated fast track flag; identifying a most recent fast track block based on the timestamp in the fast track blocks; identifying a most recent overall block based on the timestamp included in the plurality of blocks; generating a fast track hash value via hashing the most recent fast track block; generating a chain hash value via hashing the most recent overall block; and writing a new block to the blockchain including a block header comprised of a timestamp, activated fast track flag, the fast track hash value, and the chain hash value.

16 Claims, 5 Drawing Sheets

(52) U.S. Cl.
CPC .......... *H04L 9/0643* (2013.01); *H04L 9/0861* (2013.01); *H04L 9/14* (2013.01); *H04L 9/30* (2013.01); *H04L 9/3236* (2013.01); *H04L 9/3247* (2013.01); *H04L 63/06* (2013.01)

(58) Field of Classification Search
CPC ..... H04L 9/3236; H04L 63/06; G06F 16/951; G06F 21/64
See application file for complete search history.

(56) References Cited

OTHER PUBLICATIONS

Nakamoto, Bitcoin: A Peer-to-Peer Electronic Cash System, 2008. (Year: 2008).*

Dennis, et al., "A Temporal Blockchain: A Formal Analysis", 2016 International Conference on Collaboration Technologies and systems, IEEE, 2016, pp. 430-437.

Dennis, Richard, et al., "Rep on the Roll: A Peer to Peer Reputation System Based on a Rolling Blockchain", International Journal of Digital Society (IJDS), Mar. 2016, vol. 7.

Nakamoto, "Bitcoin: A Peer-to-Peer Electronic Cash System", Oct. 31, 2008, pp. 1-9.

Odell, "Blockchain—What are checkpoints?—Bitcoin Stock Exchange", Oct. 29, 2011, pp. 1.

PCT/US2017/052012, "Notification of Transmittal of the International Search Report and the Written Opinion of the International Searching Authority", Forms PCT/ISA/220, PCT/ISN210 and PCT/ISA/237, dated Dec. 6, 2017.

\* cited by examiner

METHOD AND SYSTEM FOR FAST TRACKING NAVIGATION OF BLOCKCHAINS VIA DATA MANIPULATION

FIELD

The present disclosure relates to the fast tracking of navigation of a blockchain, specifically the generation of a blockchain configured for fast track navigation via the use of additional flags and hashed referenced values in block headers to achieve faster navigation and verification of a blockchain.

BACKGROUND

Blockchains provide for a decentralized and independently verifiable storage mechanism for data. While initially developed for use with financial transactions using a cryptographic currency, additional implementations for blockchains have been developed that take advantage of the decentralized nature of the blockchain as well as the ability for the blockchain to be both immutable and independently verifiable. One such additional implementation is the use for a blockchain to provide a legal record where documents can be stored that are verifiable and tied to a specific timestamp.

One of the benefits of the blockchain is it can serve as an immutable ledger that stores a record for every transaction ever conducted via that blockchain. As such, a blockchain may store thousands, millions, or even billions of transaction records over time in a vast number of different blocks. However, this may cause a difficulty for any new node that wants to participate in the blockchain. In such instances, a blockchain may contain thousands, millions, or billions of blocks, each of which must be verified by the new node prior to the generation and addition of new blocks to the blockchain. The verification of such a large number of blocks may take a significant amount of time, during which new blocks may be added to the blockchain, further delaying the ability for the new node to participate.

Thus, there is a need for a technical solution to increase the speed at which a blockchain may be navigated for verification thereof, which can thereby reduce the time required for a new node to begin participating in the blockchain.

SUMMARY

The present disclosure provides a description of systems and methods for the generation of a blockchain configured for fast navigation. The use of specialized flags and hash values included in the headers of blocks in a blockchain may enable for the speed of navigation of a blockchain to be significantly increased, which may greatly reduce the computing time and power required to verify the blockchain. As a result, navigation and verification of the blockchain may be more efficient, which may increase the ability for new nodes to participate in the blockchain, and for users and nodes to review the blockchain to identify specific transaction records.

A method for generating a blockchain configured for fast navigation includes: storing, in a memory of a processing server, a blockchain, wherein the blockchain is comprised of a plurality of blocks, where each block includes at least one or more transaction values and a header comprised of at least a fast track flag, fast track reference, a timestamp, and hash value, and where the plurality of block is comprised of a plurality of standard blocks having a deactivated fast track flag and one or more fast track blocks having an activated fast track flag; executing, by a querying module of the processing server, a first query on the blockchain to identify a most recent fast track block based on the timestamp included in the header of each of the one or more fast track blocks; executing, by the querying module of the processing server, a second query on the blockchain to identify a most recent overall block based on the timestamp included in the header of each of the plurality of blocks; generating, by a hashing module of the processing server, a fast track hash value via application of a first predefined hashing algorithm to the identified most recent fast track block; generating, by the hashing module of the processing server, a chain hash value via application of a second predefined hashing algorithm to the identified most recent overall block; and writing, by the querying module of the processing server, a new block to the blockchain, wherein the new block includes at least a block header comprised of a timestamp, an activated fast track flag, the fast track hash value, and the chain hash value.

A system for generating a blockchain configured for fast navigation includes: a memory of a processing server configured to store a blockchain, wherein the blockchain is comprised of a plurality of blocks, where each block includes at least one or more transaction values and a header comprised of at least a fast track flag, fast track reference, a timestamp, and hash value, and where the plurality of block is comprised of a plurality of standard blocks having a deactivated fast track flag and one or more fast track blocks having an activated fast track flag; a querying module of the processing server configured to execute a first query on the blockchain to identify a most recent fast track block based on the timestamp included in the header of each of the one or more fast track blocks, and a second query on the blockchain to identify a most recent overall block based on the timestamp included in the header of each of the plurality of blocks; and a hashing module of the processing server configured to generate a fast track hash value via application of a first predefined hashing algorithm to the identified most recent fast track block, and a chain hash value via application of a second predefined hashing algorithm to the identified most recent overall block. The querying module of the processing server is further configured to write a new block to the blockchain, wherein the new block includes at least a block header comprised of a timestamp, an activated fast track flag, the fast track hash value, and the chain hash value.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a permissionless, distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency. In some cases, participation in a blockchain (e.g., as a node submitting and/or confirming transactions) may be permissionless (e.g., not moderated or restricted). In other cases, a blockchain may be a permissioned blockchain where only authorized computing devices may operate as nodes, where a level of participation may be based on permissions associated therewith.

System for Fast Tracking of Blockchain Navigation

Figure 1:
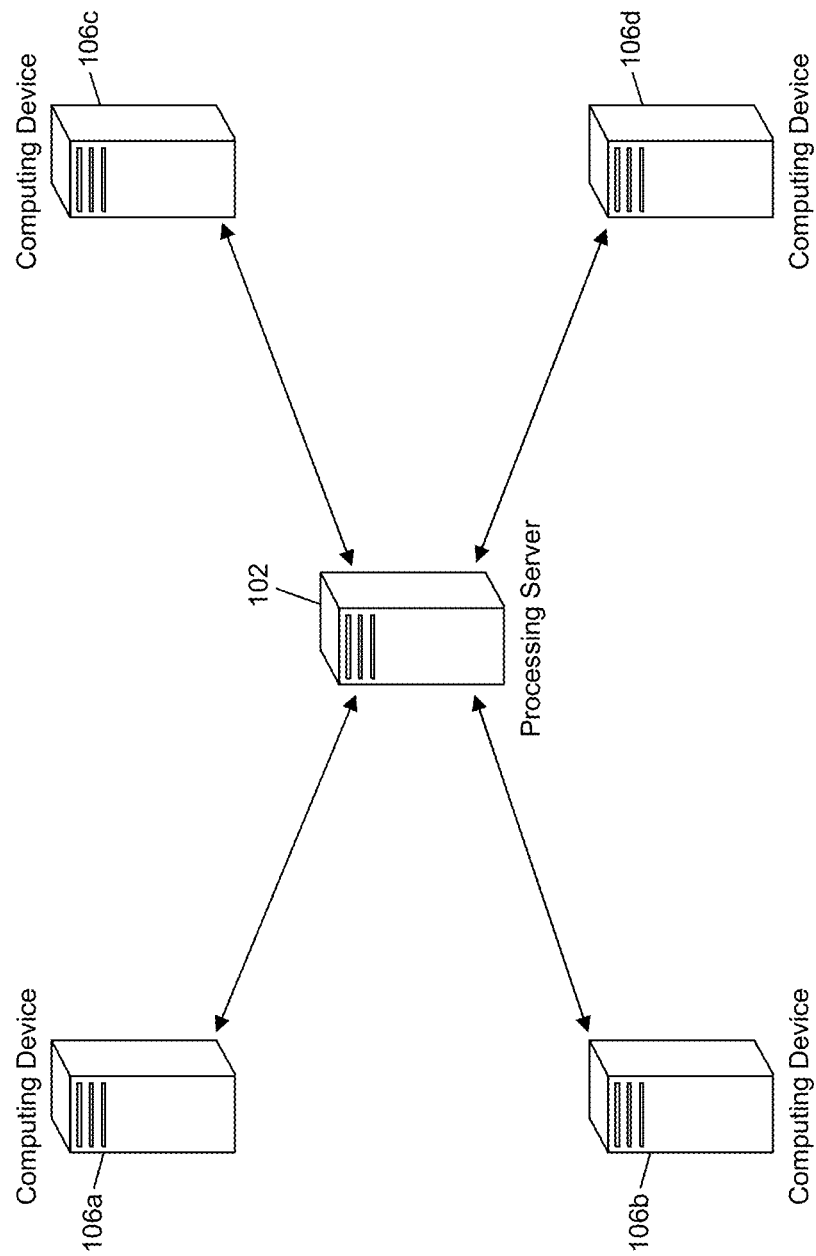
FIG. 1 is a block diagram illustrating a high level system architecture for the generation of a blockchain configured for fast navigation in accordance with exemplary embodiments.

FIG. 1 illustrates a system 100 for the generation of a blockchain that is configured for fast track navigation to facilitate quicker navigation as well as verification of blocks in the blockchain.

The system 100 may include a processing server 102. The processing server 102, discussed in more detail below, may be configured to generate a blockchain that is configured for fast track navigation, which may include specialized fast track blocks used in the fast track navigation of the blockchain. The processing server 102 may be one of a plurality of nodes associated with the blockchain, each of which may be configured to receive transaction records for inclusion in blocks that are generated for addition to the blockchain. For instance, the system 100 illustrated in FIG. 1 includes four computing devices 106, illustrated as computing devices 106a, 106b, 106c, and 106d, where each of the computing devices 106 may be an additional node in the blockchain network associated with the blockchain. In some cases, each of the computing devices 106 may be performed to perform the same functions as the processing server 102 as discussed herein. In other cases, the computing devices 106 may be configured to generate and add standard blocks to the blockchain, but may not be configured to generate and add fast track blocks to the blockchain.

In some embodiments, the blockchain may be a permissioned blockchain that may utilize digital signatures. Additional information regarding permissioned blockchains that utilize digital signatures for blocks is discussed in U.S. patent application Ser. No. 14/976,331, entitled "Method and System Blockchain Variant Using Digital Signatures," filed Dec. 21, 2015, by David J. King, which is herein incorporated by reference in its entirety. In such embodiments, a domain authority may be required to digitally sign any fast track block prior to addition to the blockchain. In some such embodiments, the processing server 102 may be a domain authority. In other such embodiments, the processing server 102 may generate fast track blocks using the methods discussed herein, which may be digitally signed by the processing server 102, but provided to a domain authority for verification and further signing before addition to the blockchain.

The processing server 102 may be configured to generate fast track blocks for addition to the blockchain. Fast track blocks may include at least a block header. In some embodiments, a fast track block, in contrast to standard blocks in the blockchain, may not include any transaction values or may include a null value in place of transaction values. In other embodiments, a fast track block may include a plurality of transaction values, and may thus perform the functions of a standard block in addition to being a fast track block used for fast track navigation.

The block header included in each block in the blockchain may include at least a timestamp, a hash value, a fast track flag, and a fast track reference. The timestamp may be a timestamp that is generated when the block header is generated for inclusion in the new block to be added to the blockchain. The timestamp may be represented using any suitable type of representation, such as a DateTime value, a time in seconds since the beginning of the UNIX epoch, etc.

The hash value may be a value that is generated via hashing of the most recent block added to the blockchain. The processing server 102 may identify the block most recently added to the blockchain based on the timestamps included in the respective block header for each of the blocks in the blockchain. The processing server 102 may then apply one or more predetermined hashing algorithms to the block to generate the hash value. The hash value may then be included in the block header for the new block that will be added to the blockchain. The use of such hash values may ensure immutability of the blockchain, as any changes to the a block would result in a different hash value being generated, which would invalidate the hash value in the next block. Furthermore, if the hash value is to be changed in that next block to accommodate, it would thus change the hash value generated from that next block, thus propagating the invalidation through the entire remainder of the blockchain.

The fast track flag may be a flag that indicates if the block is a fast track block or a standard block. The fast track flag may use any type of value to indicate an activated or deactivated status for the respective block. For instance, in one example, the fast track flag may be a single bit where a "1" value indicates activation (e.g., that the block is a fast track block) and where a "0" value indicates deactivation (e.g., that the block is not a fast track block). In another example, the fast track flag may be a Boolean where a "TRUE" value indicates activation. The fast track flag in each standard block, or each block that is not a fast track block in instances where there may be multiple block types, may be deactivated.

The fast track reference may be a hash value of the most recent fast track block in the blockchain. The most recent fast track block may be identified by the timestamp included in the block header, where the timestamp is the most recent one among all blocks that have an activated fast track flag. The processing server 102 may generate the fast track reference via applying one or more predetermined hashing algorithms to the most recent fast track block. In some embodiments, the same hashing algorithm(s) used to generate the hash value of the most recent overall block may also be used to generate the fast track reference. In other embodiments, a different algorithm or algorithms may be used.

The fast track reference and an activated fast track flag may both be included in the block header for fast track blocks to facilitate the fast navigation of the blockchain. A node in the blockchain network, or any computing device verifying the blockchain or data included therein, may quickly navigate the blockchain by identifying blocks that have activated fast track flags. For verification, the node may identify the earlier fast track block (e.g., based on timestamp) and hash that block using the predetermined hashing algorithm(s), and then verify that the fast track reference in the more recent fast track block is the same as the hash of the earlier fast track block.

In some embodiments, the processing server 102 may be configured to digitally sign a fast track block prior to addition to the blockchain. In such embodiments, the processing server 102 may store a cryptographic key pair that includes a private key and a corresponding public key. The processing server 102 may digitally sign generated fast track blocks using the private key, which may be verified using the corresponding public key, such as may be provided to nodes in the blockchain network (e.g., computing devices 106). In some cases, the processing server 102 may be configured to generate the key pair used to digitally sign blocks using a suitable encryption algorithm.

In instances where a fast track block may include one or more transaction values, the block header for the respective block may further include a Merkle root. The Merkle root may be the root of a Merkle tree that is generated using the transaction values that are to be included in the block. In some cases, the processing server 102 may order the transaction values prior to generation of the Merkle tree. The Merkle tree may be generated using one or more hashing algorithms, which, in some instances, may be the same hashing algorithm(s) used to generate the hash value of the most recent block and/or the fast track reference value included in the block header. In cases where a fast track block may not include any transaction values, the block header may still include a Merkle root, such as of a Merkle tree generated using a null or other predetermined value, or may include a null or predetermined value in place of the Merkle root.

The methods and systems discussed herein may enable the generation of a blockchain that is configured for fast navigation through the use of specialized fast track flags and fast track reference values. Such data may enable not only faster navigation of a blockchain, but also faster verification of the blocks included in the blockchain to provide for more efficient computing related thereto. As a result, new computing devices 106 may participate as nodes in the associated blockchain network more quickly than in blockchain networks that use traditional blockchains.

Processing Server

Figure 2:
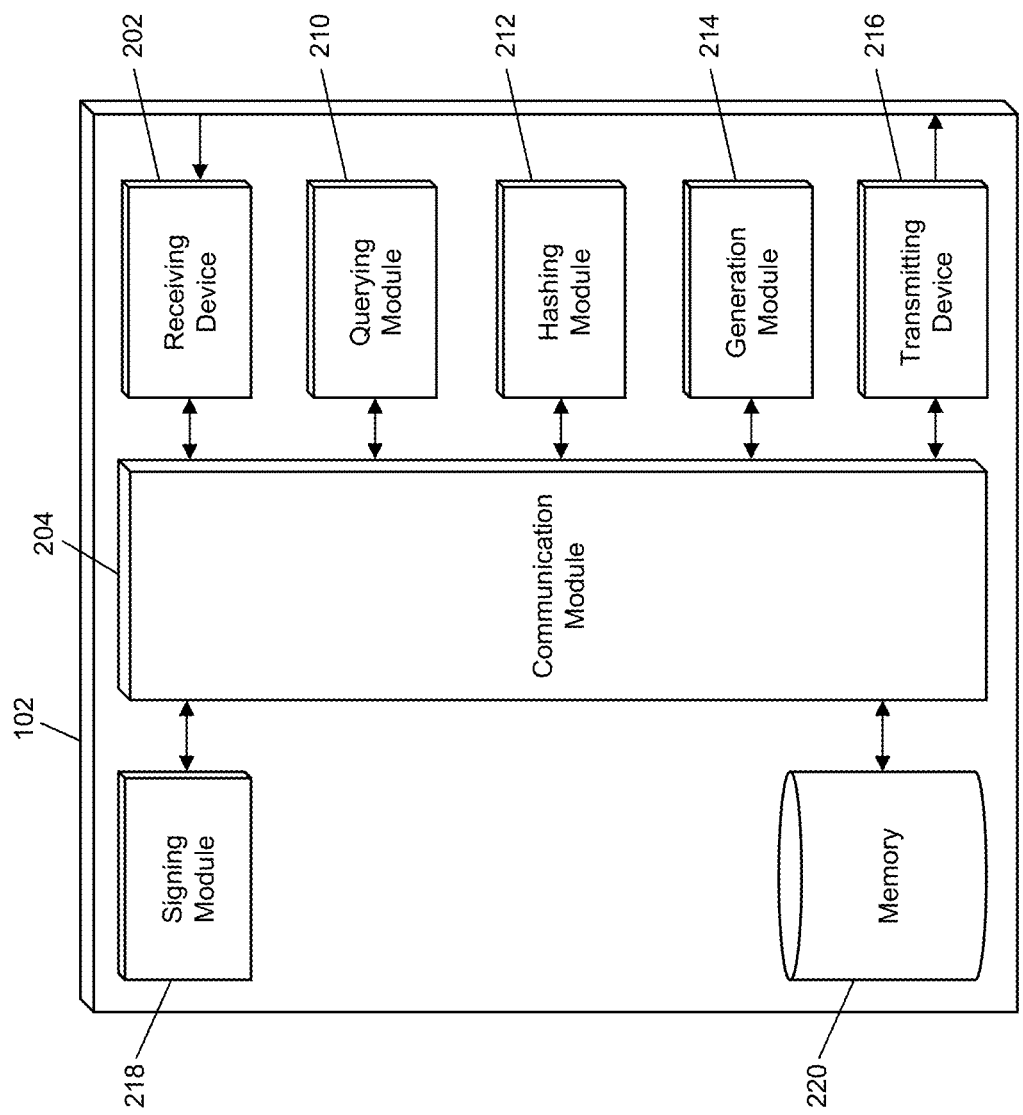
FIG. 2 is a block diagram illustrating the processing server of FIG. 1 for the generation of a blockchain configured for fast navigation in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing system 102 suitable for performing the functions as discussed herein. For example, the computer system 500 illustrated in FIG. 5 and discussed in more detail below may be a suitable configuration of the processing server 102.

The processing server 102 may include a receiving device 202. The receiving device 202 may be configured to receive data over one or more networks via one or more network protocols. The receiving device 202 may be configured to receive data from computing devices 104 and other devices and systems via suitable communication networks and corresponding network protocols. In some embodiments, the receiving device 202 may be comprised of multiple devices, such as different receiving devices for receiving data over different networks, such as a first receiving device for receiving data over a local area network and a second receiving device for receiving data via a blockchain network. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by computing devices 106, which may be superimposed or otherwise encoded with data associated with the blockchain network, such as transactions or new blocks for addition to the blockchain. The receiving device 202 may also be configured to receive data signals electronically transmitted by computing devices 106 or other nodes in the blockchain network, or by input devices interfaced with the processing server 102, that are superimposed or otherwise encoded with requests for fast track blocks. For example, a computing device 106 as a node in the blockchain network or an operator of the processing server 102 may submit a request for a new fast track block to be added to the blockchain. In some instances, such requests may be received periodically, such as a request for a new fast track block to be added after a predetermined period of time or after a predetermined number of standard blocks have been added since the last fast track block.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 210, hashing module 212, generation module 214, signing module 218, etc. As used herein, the term "module" may be software or hardware particularly programmed to receive an input, perform one or more processes using the input, and provide an output. The input, output, and processes performed by various modules will be apparent to one skilled in the art based upon the present disclosure.

The processing server 102 may include a querying module 210. The querying module 210 may be configured to execute queries on databases to identify information. The querying module 210 may receive one or more data values or query strings, and may execute a query string based thereon on an indicated database to identify information stored therein. The querying module 210 may then output the identified information to an appropriate engine or module of the processing server 102 as necessary. The querying module 210 may, for example, execute a query on a memory 220 of the processing server 102 to identify specific blocks in the blockchain, such as to identify the most recent overall block in a blockchain and the most recent fast track block in a blockchain for use in the generation of a new fast track block to be added.

The processing server 102 may also include a hashing module 212. The hashing module 212 may be configured to generate hash values via the application of one or more hashing algorithms to data supplied to the hashing module 212. The hashing module 212 may receive data to be hashed as input, may apply one or more hashing algorithms to the data, and may output the generated hash value to another module or engine of the processing server 102. In some cases, the hashing module 212 may be supplied with the hashing algorithm(s) to be used in generation a hash value. In other cases, the hashing module 212 may identify the hashing algorithm(s) to be used, such as via the generation of queries for execution by the querying module 210 on the memory 220. The hashing module 212 may be configured, for example, to generate hash values of block headers to be used as a reference to a prior block, including block headers for overall recent blocks as well as recent fast track blocks, and to generate merkle roots of transaction values for inclusion in a block header of a block.

The processing server 102 may also include a generation module 214. The generation module 214 may be configured to generate new block headers and new blocks for use in performing the functions of the processing server 102 as discussed herein. The generation module 214 may receive a request, may generate data based on that request, and may output the generated data to another module or engine of the processing server 102. For example, the generation module 212 may be instructed to generate a fast track block for inclusion in the blockchain. The generation module 212 may generate the block header for the new fast track block and generate the new block itself for writing to the blockchain for the fast track thereof. The generation module 212 may also be configured to generate blocks and/or data included therein based on formatting rules, such as may be stored in the memory 220 of the processing server 102, included in a request for fast tracking, etc. The generation module 212 may also be configured to generate a cryptographic key pair, including a private key and corresponding public key, such as may be used in the digital signing of standard and/or fast track blocks.

The processing server 102 may also include a transmitting device 216. The transmitting device 216 may be configured to transmit data over one or more networks via one or more network protocols. The transmitting device 216 may be configured to transmit data to computing devices 106 and other entities via suitable communication networks and corresponding network protocols. In some embodiments, the transmitting device 216 may be comprised of multiple devices, such as different transmitting devices for transmitting data over different networks, such as a first transmitting device for transmitting data over a local area network and a second transmitting device for transmitting data via a blockchain network. The transmitting device 216 may electronically transmit data signals that have data superimposed that may be parsed by a receiving computing device. In some instances, the transmitting device 216 may include one or more modules for superimposing, encoding, or otherwise formatting data into data signals suitable for transmission.

The transmitting device 216 may be configured to electronically transmit data signals to computing devices 106 and other nodes in the blockchain network that are superimposed or otherwise encoded with fast track blocks and standard blocks for addition to a blockchain for fast track navigation thereof. In some instances, the transmitting device 216 may also be configured to electronically transmit data signals superimposed or otherwise encoded with a public key used for verification of digital signatures generated by the processing server 102. The transmitting device 216 may also be configured to electronically transmit data signals superimposed or otherwise encoded with the full blockchain, including both standard and fast track blocks, for fast track navigation and verification thereof.

In some embodiments, the processing server 102 may also include a signing module 218. The signing module 218 may receive data to be signed as input, may digitally sign the data, and may output the signed data to another module or engine of the processing server 102. In some instances, the signing module 218 may digitally sign data using a private key associated with the processing server 102. In such instances, the signing module 218 may receive the private key as input, or may identify the private key, such as by instructing the query module 210 to identify the private key in the memory 220 of the processing server 102. The signing module 218 may be configured to digitally sign terminal blocks and starting blocks generated by the generation module 214 of the processing server 102 prior to being written to the blockchain. In some embodiments, the signing module 218 may also be configured to verify digital signatures of blocks or other data for inclusion in the blockchain, such as those may be generated by computing devices 106 or other nodes in the blockchain network, using public keys associated with the respective node.

The processing server 102 may also include a memory 220. The memory 220 may be configured to store data for use by the processing server 102 in performing the functions discussed herein, such as a private key, key pair, formatting rules, a blockchain, etc. The memory 220 may be configured to store data using suitable data formatting methods and schema and may be any suitable type of memory, such as read-only memory, random access memory, etc. The memory 220 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 220 may be comprised of or may otherwise include a relational database that utilizes structured query language for the storage, identification, modifying, updating, accessing, etc. of structured data sets stored therein.

Fast Track Navigation of a Blockchain

Figure 3:
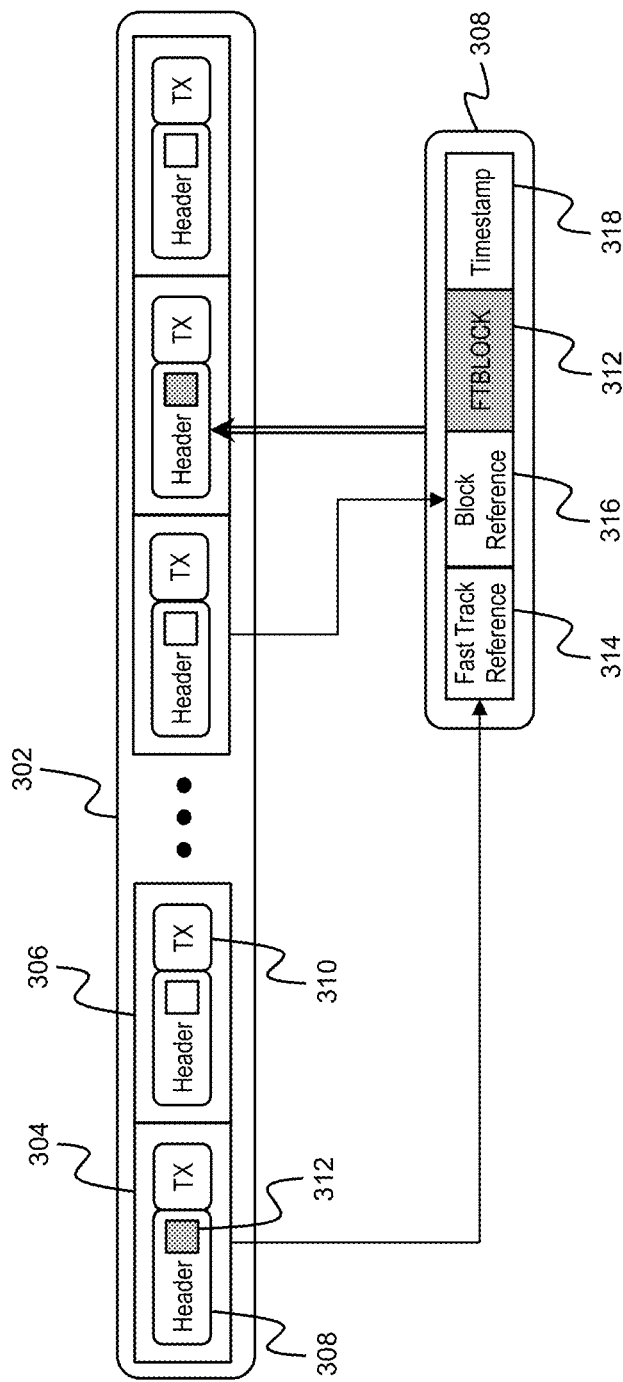
FIG. 3 is a flow diagram illustrating a process for the generation of a blockchain that is configured for fast navigation via specialized flags and hash values in accordance with exemplary embodiments.

FIG. 3 illustrates a blockchain used in conjunction with the system 100 that is configured for fast track navigation via the use of multiple fast track blocks in addition to standard blocks that comprise the blockchain.

As illustrated in FIG. 3, a blockchain 302 may be comprised of a plurality of different blocks, including a plurality of fast track blocks 304 and standard blocks 306. As illustrated, the fast track blocks 304 may be spread out such that there is a plurality of standard blocks 306 between each fast track block 304. In some embodiments, there may be a predetermined number of standard blocks 306 between fast track blocks 304. In other embodiments, a predetermined period of time may pass between the addition of a new fast track block 304 to the blockchain 302, where standard blocks 306 may continue to be added.

Each block in the blockchain 302, including both fast track blocks 304 and standard blocks 306, may include a block header 308 and one or more transaction values 310. The transaction values 310 may include transaction records or other data associated with transactions that are conducted using the blockchain 302. In some instances, fast track blocks 304 may include a null value in the transaction values 310 in place of transaction records, such as in instances where fast track blocks 304 may not be used to record transaction in the blockchain 302, such as to serve purely for navigation and verification of the blockchain 302.

Each block header 308, including block headers 308 in both fast track blocks 304 and standard blocks 306, may include at least a fast track flag 312. As illustrated in FIG. 3, the fast track flag 312 may be activated in each of the fast track blocks 304 and deactivated in each of the standard blocks 306, as illustrated by the shading of the fast track flag 312. Each of the block headers 308 may also include a fast track reference 314, block reference 316, and a timestamp 318.

As illustrated in FIG. 3, the fast track reference 314 may be based on the previous fast track block 304 that is in the blockchain 302. The fast track reference 314 may be a hash value generated via application of one or more hashing algorithms (e.g., via the hashing module 212 of the processing server 102) to the previous fast track block 304. In instances where the fast track block 304 being added may be the very first fast track block 304 in the blockchain 302, then the fast track reference 314 may be a hash of the very first block in the blockchain 302, which, in such an instance, may be a standard block 306. In some cases, the very first block in the blockchain 302, such as illustrated in FIG. 3, may be a fast track block 304. In such a case, the fast track reference 314 may be a null value or the hashing of a null value.

The block reference 316 may be based on the previous block in the blockchain 302, as determined based on the respective timestamps 318. The block reference 316 may be a hash value generated via application of one or more hashing algorithms (e.g., via the hashing module 212 of the processing server 102) to the previous block, where the previous block may be a fast track block 304 or a standard block 306. In some instances, the same hashing algorithm(s) used to generate the fast track reference 314 may be used for the block reference 316. In cases where the block being added is the first block in the blockchain 302, the block reference 316 may be a null value or a hash of a null value, which may indicate the block as being the start to the blockchain 302.

The timestamp 308 may be a stamp of the time when the respective block header 308 is generated for addition to the blockchain 302. The timestamp 308 may be represented using any suitable format. In some cases, a block header 308 may include additional data, such as to accommodate further configurations and data for the blockchain 302. For instance, block headers 308 in the blockchain 302 may also include a Merkle root, generated using the transaction values 310 in the respective block. In some embodiments, a block may be digitally signed by the processing server 102 after generation, and prior to addition to the blockchain 302, such as via the signing module 218 of the processing server 102 using a private key associated therewith.

Exemplary Method for Generating a Blockchain Configured for Fast Navigation

Figure 4:
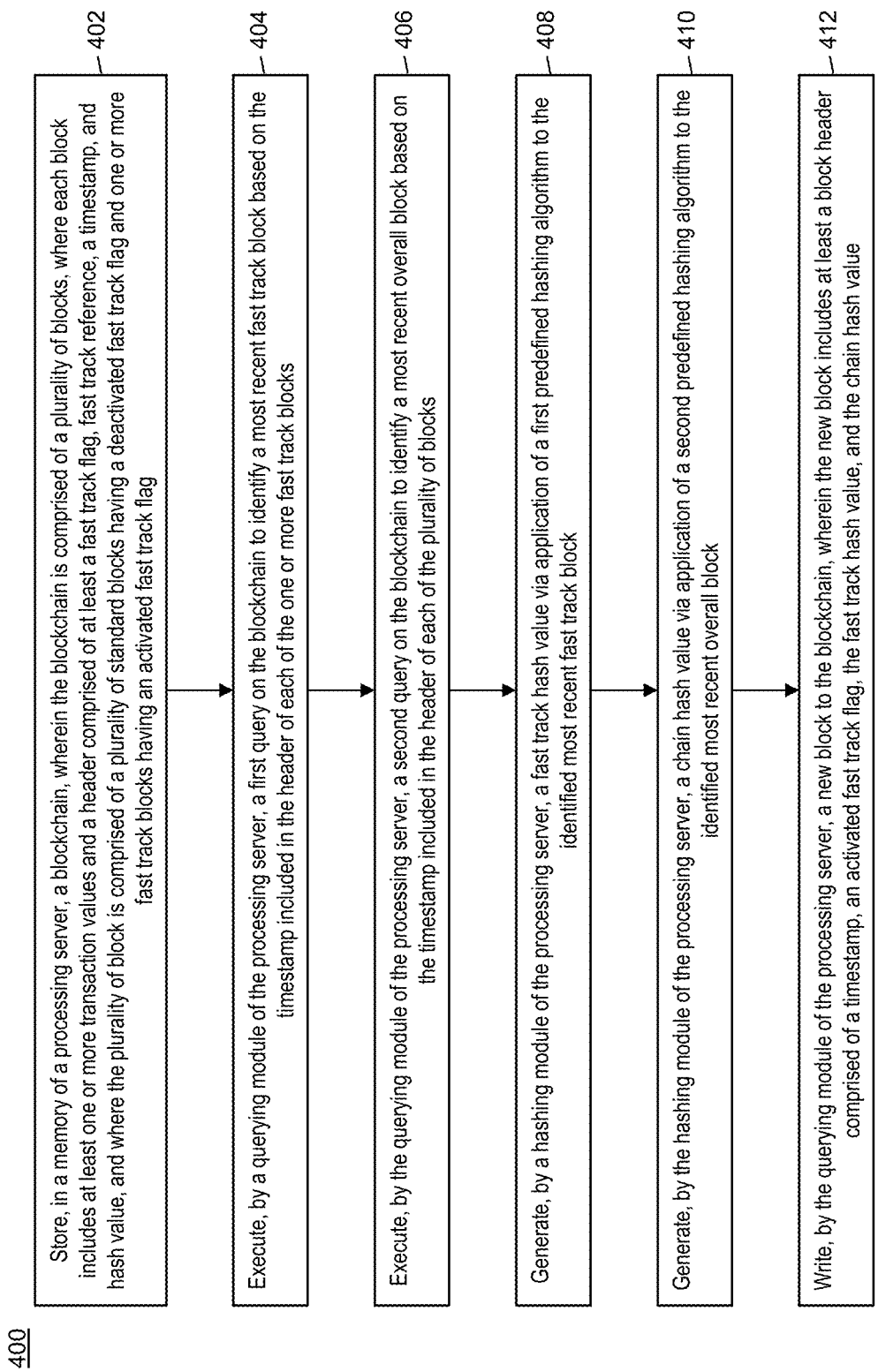
FIG. 4 is a flow chart illustrating an exemplary method for generation of a blockchain configured for fast navigation in accordance with exemplary embodiments.

FIG. 4 illustrates a method 400 for the generation of a blockchain that is configured for fast track navigation via the use of specially configured flags and reference values in block headers.

In step 402, a blockchain (e.g., blockchain 302) may be stored in a memory (e.g., the memory 220) of a processing server (e.g., the processing server 102), wherein the blockchain is comprised of a plurality of blocks, where each block includes at least one or more transaction values (e.g., transaction values 310) and a header (e.g., block header 308) comprised of at least a fast track flag (e.g., fast track flag 312), fast track reference (e.g., fast track reference 314), a timestamp (e.g., timestamp 318), and hash value (e.g., block reference 316), and where the plurality of blocks is comprised of a plurality of standard blocks (e.g., standard blocks 306) having a deactivated fast track flag and one or more fast track blocks (e.g., fast track blocks 304) having an activated fast track flag. In step 404, a first query may be executed on the blockchain by a querying module (e.g., the querying module 210) of the processing server to identify a most recent fast track block based on the timestamp included in the header of each of the one or more fast track blocks.

In step 406, a second query may be executed on the blockchain by the querying module of the processing server to identify a most recent overall block based on the timestamp included in the header of each of the plurality of blocks. In step 408, a fast track hash value may be generated by a hashing module (e.g., the hashing module 212) of the processing server via application of a first predefined hashing algorithm to the identified most recent fast track block.

In step 410, a chain hash value may be generated by the hashing module of the processing server via application of a second predefined hashing algorithm to the identified most recent overall block. In step 412, a new block may be written to the blockchain by the querying module of the processing server, wherein the new block includes at least a block header comprised of a timestamp, an activated fast track flag, the fast track hash value, and the chain hash value.

In one embodiment, the first predefined hashing algorithm and the second predefined hashing algorithm may be the same algorithm. In some embodiments, the most recent overall block may be a standard block. In one embodiment, the fast track reference included in the header of each of the plurality of standard blocks may be a null value. In some embodiments, the method 400 may further include electronically transmitting, by a transmitting device (e.g., the transmitting device 216) of the processing server, the blockchain including the new block to a plurality of computing devices (e.g., computing devices 106) associated with the blockchain.

In one embodiment, the method 400 may also include: storing, in the memory of the processing server, a private key of a key pair associated with the processing server; and digitally signing, by a signing module (e.g., the signing module 218) of the processing server, the new block using the private key prior to writing the new block to the blockchain. In a further embodiment, the method 400 may even further include generating, by a generation module (e.g., the generation module 214) of the processing server, the key pair comprised of the private key and a corresponding public key.

In some embodiments, the method 400 may further include: receiving, by a receiving device (e.g., the receiving device 202) of the processing server, one or more transaction values; and generating, by the hashing module of the processing server, a Merkle root via application of a predetermined hashing algorithm to the received one or more transaction values, wherein the generated Merkle root is included in the header of the new block written to the blockchain, and the one or more transaction values are included in the new block written to the blockchain. In a further embodiment, the second predefined hashing algorithm and the predetermined hashing algorithm may be the same algorithm. In one embodiment, a first block of the blockchain as based on the timestamp included in the header of each of the plurality of blocks may be one of the one or more fast track blocks.

Computer System Architecture

Figure 5:
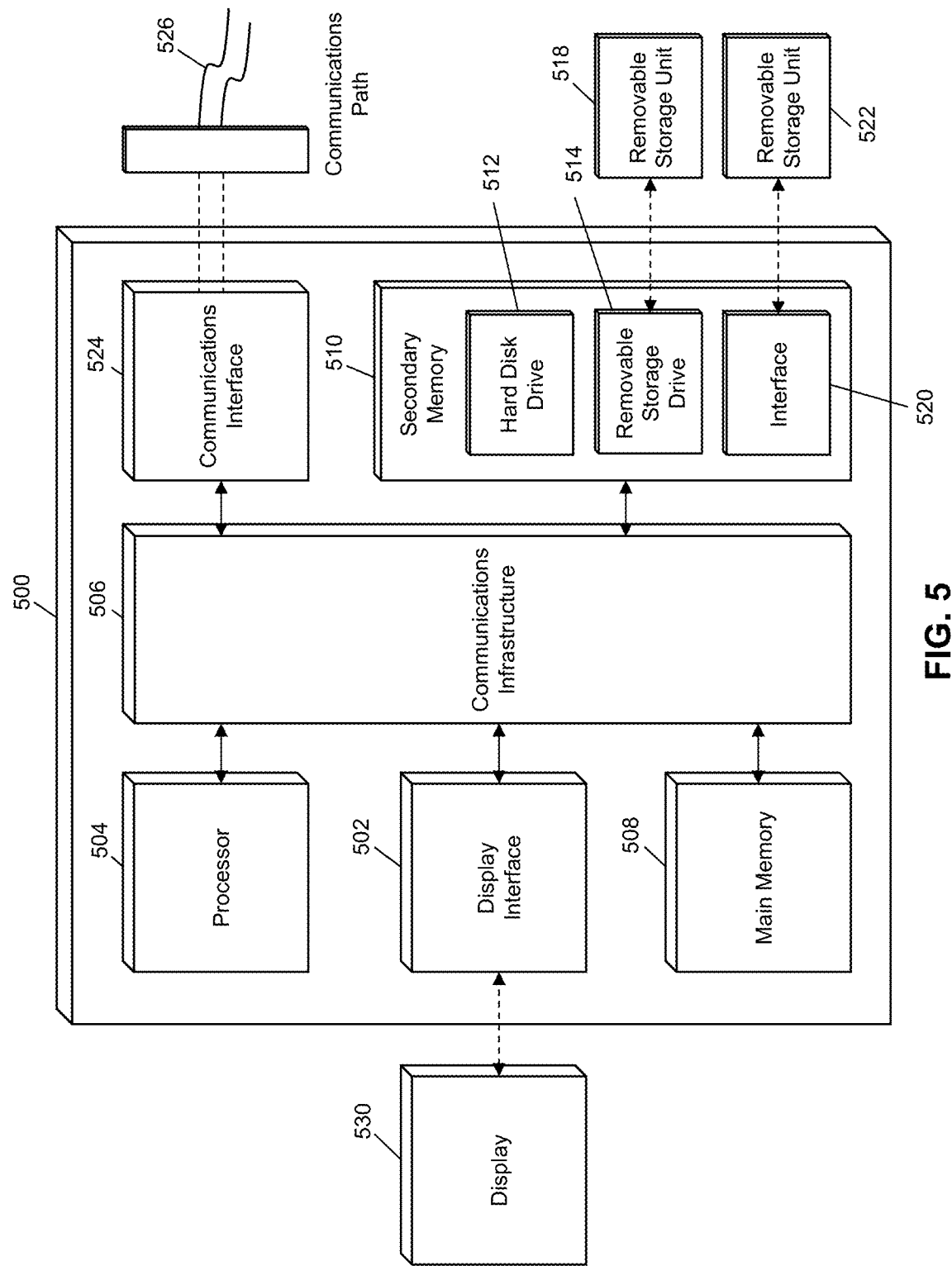
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the processing server 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for the generation of blockchains configured for fast track navigation. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for generating a blockchain configured for fast navigation, comprising:

storing, in a memory of a hardware processing server, the blockchain, wherein the blockchain is comprised of a plurality of blocks, where each block of the plurality of blocks includes at least one or more transaction values and a header comprised of at least a fast track flag, fast track reference, a timestamp, and hash value, and where the plurality of blocks is comprised of a plurality of standard blocks having a deactivated fast track flag and one or more fast track blocks having an activated fast track flag, wherein each of the one or more fast track blocks is periodic in the plurality of blocks, a period being based on one of: a predetermined period of time and a number of standard blocks added between the one or more fast track blocks;

executing, by a querying module of the hardware processing server, a query on the blockchain to identify a most recently added fast track block based on the timestamp included in the header of each of the one or more fast track blocks of the plurality of blocks;

generating, by a hashing module of the processing server, a fast track hash value in the fast track reference via application of a predefined hashing algorithm to the identified most recently added fast track block; and writing, by the querying module of the hardware processing server, a new block to the blockchain, wherein the new block includes at least a block header comprised of a timestamp, an activated fast track flag, the fast track hash value, and a chain hash value, wherein verification of a subset of standard blocks in the plurality of blocks between the most recently added fast track block and the new block is performed by verifying the most recently added fast track block using the fast track hash value.

2. The method of claim 1, wherein a most recent overall block is a standard block.

3. The method of claim 1, wherein the fast track reference included in the header of each of the plurality of standard blocks is a null value.

4. The method of claim 1, further comprising:
electronically transmitting, by a transmitting device of the hardware processing server, the blockchain including the new block to a plurality of computing devices associated with the blockchain.

5. The method of claim 1, further comprising:
storing, in the memory of the hardware processing server, a private key of a key pair associated with the hardware processing server; and
digitally signing, by a signing module of the hardware processing server, the new block using the private key prior to writing the new block to the blockchain.

6. The method of claim 5, further comprising:
generating, by a generation module of the hardware processing server, the key pair comprised of the private key and a corresponding public key.

7. The method of claim 1, further comprising:
receiving, by a receiving device of the hardware processing server, one or more transaction values; and
generating, by the hashing module of the hardware processing server, a Merkle root via application of a predetermined hashing algorithm to the received one or more transaction values, wherein
the generated Merkle root is included in the header of the new block written to the blockchain, and
the one or more transaction values are included in the new block written to the blockchain.

8. The method of claim 1, wherein a first block of the blockchain as based on the timestamp included in the header of each of the plurality of blocks is one of the one or more fast track blocks.

9. A system for generating a blockchain configured for fast navigation, comprising:
a hardware processing server;
a memory of the hardware processing server configured to store the blockchain, wherein the blockchain is comprised of a plurality of blocks, where each block of the plurality of blocks includes at least one or more transaction values and a header comprised of at least a fast track flag, fast track reference, a timestamp, and hash value, and where the plurality of block is comprised of a plurality of standard blocks having a deactivated fast track flag and one or more fast track blocks having an activated fast track flag, wherein each of the one or more fast track blocks is periodic in the plurality of blocks, a period being based on one of: a predetermined period of time and a number of standard blocks added between the one or more fast track blocks;
a querying module of the hardware processing server configured to execute a query on the blockchain to identify a most recently added fast track block based on the timestamp included in the header of each of the one or more fast track blocks of the plurality of blocks;
a hashing module of the hardware processing server configured to generate a fast track hash value in the fast track reference via application of a predefined hashing algorithm to the identified most recently added fast track block; and
the querying module of the hardware processing server configured to write a new block to the blockchain, wherein the new block includes at least a block header comprised of a timestamp, an activated fast track flag, the fast track hash value, and a chain hash value, wherein verification of a subset of standard blocks in the plurality of blocks between the most recently added fast track block and the new block is performed by verifying the most recently added fast track block using the fast track hash value.

10. The system of claim 9, wherein a most recent overall block is a standard block.

11. The system of claim 9, wherein the fast track reference included in the header of each of the plurality of standard blocks is a null value.

12. The system of claim 11, further comprising:
a signing module, wherein
the memory of the hardware processing server is further configured to store a private key of a key pair associated with the hardware processing server, and
the signing module of the hardware processing server is configured to digitally sign the new block using the private key prior to writing the new block to the blockchain.

13. The system of claim 12, further comprising:
a generation module of the hardware processing server configured to generate the key pair comprised of the private key and a corresponding public key.

14. The system of claim 9, further comprising:
a transmitting device of the hardware processing server configured to electronically transmit the blockchain including the new block to a plurality of computing devices associated with the blockchain.

15. The system of claim 9, further comprising:
a receiving device of the hardware processing server configured to receive one or more transaction values, wherein
the hashing module of the hardware processing server is further configured to generate a Merkle root via application of a predetermined hashing algorithm to the received one or more transaction values,
the generated Merkle root is included in the header of the new block written to the blockchain, and
the one or more transaction values are included in the new block written to the blockchain.

16. The system of claim 9, wherein a first block of the blockchain as based on the timestamp included in the header of each of the plurality of blocks is one of the one or more fast track blocks.

* * * * *